(12) United States Patent
Tominaga et al.

(10) Patent No.: US 11,139,519 B2
(45) Date of Patent: Oct. 5, 2021

(54) SEALED CELL AND METHOD FOR MANUFACTURING SAME

(71) Applicants: SANYO Electric Co., Ltd., Osaka (JP); Panasonic Corporation, Osaka (JP)

(72) Inventors: Yusuke Tominaga, Hyogo (JP); Kazumichi Shimizu, Osaka (JP); Shota Ikeda, Osaka (JP); Kyosuke Miyata, Osaka (JP); Atsushi Ueda, Osaka (JP); Sadahiro Hattori, Kanagawa (JP); Shinya Mori, Hyogo (JP); Ryunosuke Yokoo, Hyogo (JP); Koji Funami, Kyoto (JP); Takaaki Kassai, Osaka (JP)

(73) Assignees: SANYO Electric Co., Ltd., Daito (JP); PANASONIC CORPORATION, Kadoma (JP)

( * ) Notice: Subject to any disclaimer, the term of this patent is extended or adjusted under 35 U.S.C. 154(b) by 30 days.

(21) Appl. No.: 16/642,477

(22) PCT Filed: Jul. 23, 2018

(86) PCT No.: PCT/JP2018/027473
§ 371 (c)(1),
(2) Date: Feb. 27, 2020

(87) PCT Pub. No.: WO2019/044265
PCT Pub. Date: Mar. 7, 2019

(65) Prior Publication Data
US 2020/0259133 A1 Aug. 13, 2020

(30) Foreign Application Priority Data
Aug. 30, 2017 (JP) .............................. JP2017-165232

(51) Int. Cl.
*H01M 50/183* (2021.01)
*H01M 10/04* (2006.01)
(Continued)

(52) U.S. Cl.
CPC ..... *H01M 50/183* (2021.01); *H01M 10/0422* (2013.01); *H01M 50/169* (2021.01); *H01M 50/46* (2021.01); *H01M 50/531* (2021.01)

(58) Field of Classification Search
None
See application file for complete search history.

(56) References Cited

U.S. PATENT DOCUMENTS

2005/0042506 A1* 2/2005 Tomimoto ............ H01M 50/56
429/161
2006/0024571 A1 2/2006 Kim et al.
(Continued)

FOREIGN PATENT DOCUMENTS

JP 2004-158318 A 6/2004
JP 2005-44691 A 2/2005
(Continued)

OTHER PUBLICATIONS

Notification of Transmittal of Copies of Translation of the International Preliminary Report on Patentabililty (Form PCT/IB/338) issued in counterpart International Application No. PCT/JP2018/027473 dated Mar. 12, 2020 with Forms PCT/IB/308, PCT/IB/373, PCT/IB/326, and PCT/ISA/237, with English translation (12 pages). International Search Report dated Oct. 23, 2018, issued in counterpart International Application No. PCT/JP2018/027473, with English Translation. (3 pages).

*Primary Examiner* — Alix E Eggerding
(74) *Attorney, Agent, or Firm* — Westerman, Hattori, Daniels & Adrian, LLP

(57) ABSTRACT

A sealed cell includes a bottomed cylindrical outer casing can. The outer casing can is formed by nickel-plated iron, and a lead connected to one of a positive electrode and a
(Continued)

negative electrode, and the outer casing can, are welded by a welding part formed from the outside surface of the outer casing can toward the lead. The welding part is formed by molten traces and has a first layer and a second layer having a higher nickel concentration than the first layer. The first layer is formed from the lead through to the inside of the outer casing can, the second layer is formed so as to adjoin the first layer on the outside surface side of the outer casing can, and the whole of the first layer is covered with the second layer when the welding part is viewed from the outside of the outer casing can.

12 Claims, 11 Drawing Sheets

(51) Int. Cl.
  *H01M 50/46* (2021.01)
  *H01M 50/169* (2021.01)
  *H01M 50/531* (2021.01)

(56) References Cited

U.S. PATENT DOCUMENTS

| | | | |
|---|---|---|---|
| 2009/0317712 | A1 | 12/2009 | Kim et al. |
| 2011/0045357 | A1* | 2/2011 | Saito ............... H01M 10/052 |
| | | | 429/303 |
| 2017/0069901 | A1 | 3/2017 | Haraguchi et al. |
| 2018/0281111 | A1* | 10/2018 | Kassai ............... H01M 50/528 |

FOREIGN PATENT DOCUMENTS

| | | |
|---|---|---|
| JP | 2006-12787 A | 1/2006 |
| JP | 2010-3686 A | 1/2010 |
| JP | 2012-35296 A | 2/2012 |
| JP | 2015-162326 A | 9/2015 |
| JP | 2015-170395 A | 9/2015 |
| JP | 2016-207412 A | 12/2016 |

\* cited by examiner

SEALED CELL AND METHOD FOR MANUFACTURING SAME

CROSS REFERENCE TO RELATED APPLICATIONS

This application is a National Phase of PCT International Patent Application Number PCT/JP2018/027473, filed on Jul. 23, 2018, claiming the benefit of priority of Japanese Patent Application No. 2017-165232 filed on Aug. 30, 2017, the entire content of which are hereby incorporated herein by reference.

TECHNICAL FIELD

The present disclosure generally relates to a sealed cell and a method for the same.

BACKGROUND

In recent years, a secondary battery is used by being incorporated in an electronic apparatus such as a personal computer, but is not limited thereto, and is expected to be used as a power source for supplying electric power to a vehicle driving motor. A lithium ion secondary battery can obtain high energy, but when metal foreign matter or the like is mixed in the battery to cause an internal short circuit, a problem such as heat generation of the battery itself may occur.

An outer casing can and a lead connected to one of a positive electrode and a negative electrode of an electrode body have been conventionally connected mainly by resistance welding. However, this resistance welding has a problem in that spatters are generated in a battery in the welding process, and metal foreign matter is mixed in the battery, which causes deterioration in manufacturing quality, safety, and reliability of the battery due to voltage failure. Therefore, in recent years, the battery is provided in which the outer casing can and the lead or a current collecting tab corresponding to the lead are welded by being irradiated with an energy beam such as a laser beam from the outside of the outer casing can, to thereby prevent generation of the spatters (for example, see Patent Literatures 1 to 3).

In addition, Patent Literature 4 discloses that a battery is manufactured by being irradiated with energy beams from the outside of the outer casing can, sequentially in two steps in which a welding process of welding the outer casing can and a current collector corresponding to the lead is performed, and then an annealing process is performed. In this battery, the welding part includes a first layer and a second layer which are laminated, the second layer containing crystal grains that are finer than crystal grains contained in the first layer.

CITATION LIST

Patent Literature

Patent Literature 1: JP 2010-3686 A
Patent Literature 2: JP 2015-162326 A
Patent Literature 3: JP 2016-207412 A
Patent Literature 4: JP 2005-44691 A

SUMMARY

Technical Problem

An outer casing can may be formed by nickel-plated iron. In this case, in the battery in which a lead is welded to the outer casing can by being irradiated with an energy beam from the outside of the outer casing can, a nickel plated layer at the irradiation portion of the energy beam on the outside surface of the outer casing can and the base metal of the outer casing can are fused so that the nickel and the iron are mixed with each other. Thus, the entire molten trace becomes an alloy of iron of the base metal of the outer casing can and nickel of the nickel plated layer of the outer casing can, and the alloy is brought into a state exposed to the outside surface of the outer casing can. As a result, the molten trace exposed to the outside surface of the outer casing can has a lower nickel concentration than the nickel plated layer which is not fused by the energy beam, which may easily cause corrosion and leakage of electrolyte.

In the battery disclosed in Patent Literature 4, the outer casing can is irradiated with energy beams in two steps from the outside of the outer casing can, but a second layer formed by irradiation with an energy beam in a second step passes through the inside surface of the outer casing can, thereby reaching the lead. Since the nickel component in the nickel plated layer of the outer casing can be diffused over a large area of the outer casing can, the nickel component being fused by the energy beam in the second step, the nickel concentration of the molten trace exposed to the outside surface of the outer casing can may be reduced.

It is an advantage of the present disclosure to provide a sealed cell capable of improving a corrosion preventive property of molten trace exposed to a surface of an outer casing can in the sealed cell in which a lead is welded to the outer casing can, and a manufacturing method for the same.

Solution to Problem

A sealed cell according to the present disclosure includes an electrode body in which at least one positive electrode and at least one negative electrode are laminated with a separator interposed therebetween, and an outer casing can formed in a bottomed cylindrical shape, the outer casing can accommodating the electrode body, wherein the outer casing can is formed by nickel-plated iron, a lead connected to one of the positive electrode and the negative electrode is welded to the outer casing can in a welding part formed from an outside surface of the outer casing can toward the lead, the welding part is formed by molten traces, and includes a first layer, and a second layer having a higher nickel concentration than the first layer, the first layer is formed from the lead to an inside of the outer casing can, the second layer is formed so as to adjoin the first layer on the outside surface side of the outer casing can, and the whole of the first layer is covered with the second layer when the welding part is viewed from outside of the outer casing can.

A manufacturing method for a sealed cell according to the present disclosure is a manufacturing method for a sealed cell according to the present disclosure, wherein a welding process of welding a lead and an outer casing can including a first beam irradiation process in which an outside surface of an outer casing can is irradiated with a first energy beam from outside of the outer casing can to weld the outer casing can and the lead, and a second beam irradiation process in which, after the first beam irradiation process, a wider range than an irradiation range on the outside surface of the outer casing can which is irradiated with the first energy beam is irradiated with a second energy beam from the outside of the outer casing can.

A manufacturing method for another sealed cell according to the present disclosure is a manufacturing method for a sealed cell according to the present disclosure, wherein in a welding process of welding a lead and an outer casing can, a diffraction grating is used to divide one energy beam into a first energy beam and a second energy beam, and irradiation portions of the first energy beam and the second energy beam are moved relative to the outer casing can so that the first energy beam is applied, prior to the second energy beam, to a predetermined position on an outside surface of the outer casing can, to weld the outer casing can and the lead, so that the first layer and the second layer are formed.

Advantageous Effects of Invention

According to a sealed cell according to the present disclosure and a manufacturing method for the same, it is possible to improve a corrosion preventive property of molten trace exposed to a surface of an outer casing can in the sealed cell in which a lead is welded to the outer casing can.

BRIEF DESCRIPTION OF DRAWINGS

FIGS. 14A and 14B are a diagram illustrating a bottom surface side half part of a sealed cell according to another example of the embodiment in which FIG. 14A is a sectional view thereof and FIG. 14B is an enlarged view illustrating a portion D of FIG. 14A.

DESCRIPTION OF EMBODIMENTS

Hereinafter, embodiments according to the present disclosure will be described in detail with reference to the accompanying drawings. In the following description, specific shapes, materials, numerical values, directions, or other elements are exemplary merely for facilitating understanding of the present disclosure, and may be suitably changed according to specifications of a sealed cell. In the following description, the term "almost" is used to mean, for example, cases where the values are completely equal, and also cases where the values can be considered to be substantially the same. Further, in the following, when a plurality of embodiments and variants are included, characteristic portions thereof may be suitably combined, and such a combination is conceived of from the start.

Hereinafter, although a case will be described where a sealed cell is a cylindrical non-aqueous electrolyte secondary battery, the sealed cell may be a square battery or the like other than the cylindrical battery. In addition, the sealed cell is not limited to a lithium ion secondary battery as described below, but may be another secondary battery such as a nickel hydride battery and a nickel cadmium battery, or a primary battery such as a dry cell or a lithium cell. An electrode body included in a cell is not limited to that having a wound structure as described below, but may be an electrode body having a laminated structure in which a plurality of positive electrodes and negative electrodes are alternately laminated with separators interposed therebetween.

Figure 1:
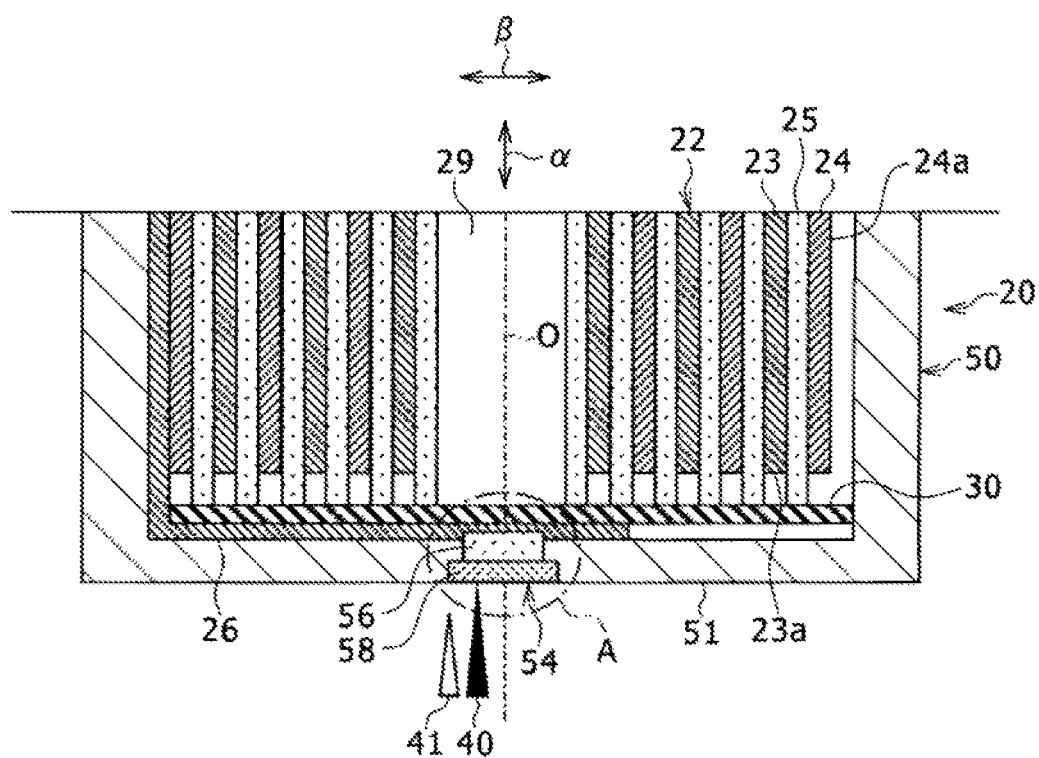
FIG. 1 is a sectional view illustrating a bottom surface side half part of a sealed cell according to an example of an embodiment.
Figure 2:
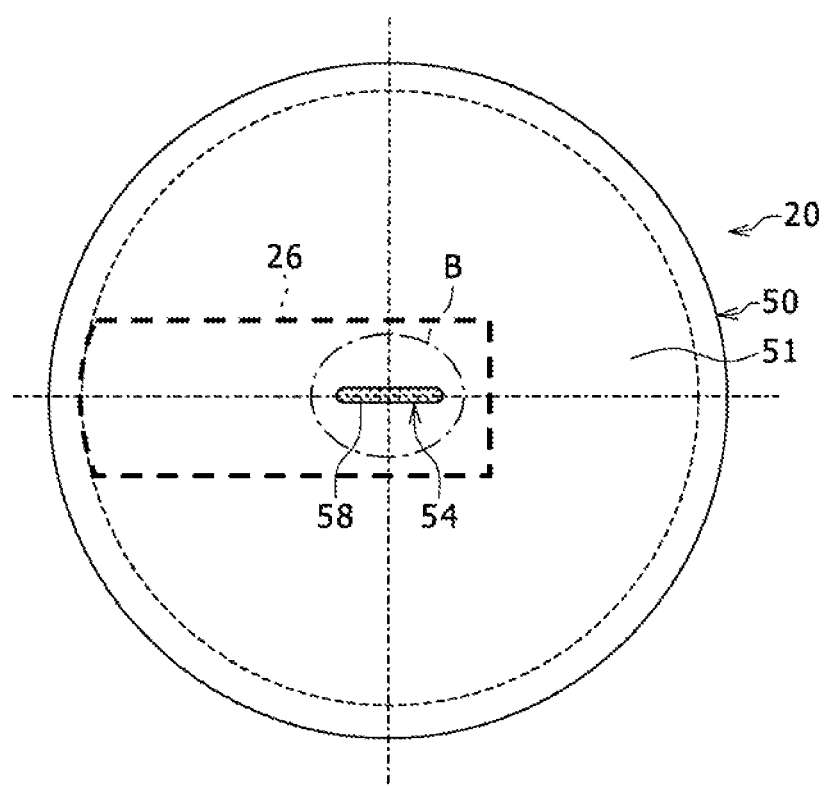
FIG. 2 is a bottom plan view of the sealed cell illustrated in FIG. 1.

FIG. 1 is a sectional view illustrating a bottom surface side half part of a sealed cell 20 according to an example of an embodiment. FIG. 2 is a bottom plan view of the sealed cell 20 illustrated in FIG. 1. Hereinafter, the sealed cell 20 is described as a cell 20. As illustrated in FIG. 1 and FIG. 2, the cell 20 includes an electrode body 22 having a winding structure, a non-aqueous electrolyte (not illustrated), and an outer casing can 50. The electrode body 22 having a winding structure includes a positive electrode 23, a negative electrode 24, and a separator 25, where the positive electrode 23 and the negative electrode 24 are laminated with the separator 25 interposed therebetween, and are spirally wound. Hereinafter, one side in the axial direction of the electrode body 22 is referred to as an "upper side" and the other side in the axial direction is referred to as a "lower side" in some cases. The non-aqueous electrolyte contains a non-aqueous solvent and an electrolyte salt such as lithium salt dissolved in the non-aqueous solvent. The non-aqueous electrolyte is not limited to a liquid electrolyte and may be a solid electrolyte such as a gel polymer.

The positive electrode 23 includes a belt-like positive electrode current collector 23a, and a positive electrode lead (not illustrated) is connected to the current collector 23a. The positive electrode lead is an electrically conductive member for electrically connecting the positive electrode current collector 23a to a positive electrode terminal (not illustrated), and extends from an upper end of an electrode group toward one side (an upward direction in FIG. 1) in the axial direction α of the electrode body 22. Here, the electrode group refers to the electrode body 22 except leads. The positive electrode lead is provided, for example, at almost the center portion in the radial direction β of the electrode body 22.

The negative electrode 24 includes a belt-like negative electrode current collector 24a, and a negative electrode lead 26 is connected to the current collector 24a. The negative electrode lead 26 is an electrically conductive member for electrically connecting the negative electrode current collector 24a to the outer casing can 50 serving as a negative electrode terminal, and extends from a lower end of a winding-finish side end portion of the electrode group toward the other side (a downward direction in FIG. 1) in the axial direction α.

A constituent material of each lead is not limited to a particular material. The positive electrode lead can be composed of an aluminum-based metal, and the negative electrode lead 26 can be composed of a nickel- or copper-based metal, or a metal containing both nickel and copper.

The negative electrode lead 26 is bent at almost a right angle near a bottom plate part 51 in the outer casing can 50 described later, and is superposed on an inner surface of the bottom plate part 51 in a part facing a winding core part 29 of the electrode body 22 via an insulating plate 30 to contact the inner surface of the bottom plate part 51. In this state, the bottom plate part 51 is irradiated sequentially with a first laser beam 40 and a second laser beam 41, from the outside of the outer casing can 50 so that the outer casing can 50 and the negative electrode lead 26 are welded by a welding part 54. Each of the laser beams 40 and 41 corresponds to an energy beam.

As illustrated in FIG. 2, the welding part 54 has a linear planar shape when viewed from the outside (a lower side in FIG. 1) of the bottom plate part 51. Note that in the present disclosure, the welding part refers to a portion formed by molten traces obtained by being irradiated with the respective laser beams 40 and 41 to fuse and solidify the outer casing can 50 and the negative electrode lead 26. When being irradiated with the first laser beam 40 and the second laser beam 41, the welding part 54 is formed by laminating a first layer 56 on the negative electrode lead 26 side and a second layer 58 on the outer casing can side. The second layer 58 has a higher nickel concentration (mass %) than the first layer 56. The welding part 54 and the welding process will be described in detail later.

The outer casing can 50 is a container formed by processing a material made of nickel-plated iron into a bottomed cylindrical shape.

An opening portion of the outer casing can 50 is sealed by a sealing body (not illustrated). The outer casing can 50 accommodates the electrode body 22 and the non-aqueous electrolyte. The insulating plate 30 is disposed in a lower portion of the electrode body 22. The negative electrode lead 26 passes through the outside of the insulating plate 30 to extend to a bottom side of the outer casing can 50 and be welded to an inner surface of the bottom plate part 51 of the outer casing can 50. A thickness of the bottom plate part 51 which is a bottom of the outer casing can 50 is, for example, 0.2 to 0.5 mm.

The electrode body 22 has a winding structure in which the positive electrode 23 and the negative electrode 24 are spirally wound with the separator 25 interposed therebetween. The positive electrode 23, the negative electrode 24 and the separator 25 are formed in a belt-like shape, and are spirally wound to be alternately laminated in the radial direction β of the electrode body 22. In the present embodiment, the winding core part 29 including a winding center axis O of the electrode body 22 is a cylindrical space.

The positive electrode 23 includes the belt-like positive electrode current collector 23a and a positive electrode active material layer formed on the current collector. For example, the positive electrode active material layers are formed on two surfaces of the positive electrode current collector 23a. For the positive electrode current collector 23a, foil of a metal such as aluminum, a film with such a metal disposed as an outer layer, and the like are used, for example. The suitable positive electrode current collector 23a is foil of a metal, such as a metal composed mainly of aluminum or an aluminum alloy, that is stable in the electric potential range of the positive electrode.

It is preferable for the positive electrode active material layer to contain a positive electrode active material, an electrically conductive agent, and a binding agent. The positive electrode 23 is manufactured by, for example, applying a positive electrode mixture slurry containing a positive electrode active material, an electrically conductive agent, a binding agent, and a solvent such as N-methyl-2-pyrrolidone (NMP), to two surfaces of the positive electrode current collector 23a, drying it and rolling it.

The positive electrode active material may be a lithium-containing transition metal oxide containing a transition metal element such as Co, Mn, and/or Ni. It is preferable that the lithium-containing transition metal oxide is a composite oxide represented by the general formula $Li_{1+x}MO_2$ (wherein $-0.2<x\leq0.2$, and M contains at least one of Ni, Co, Mn, and Al), but this is not particularly limited.

Examples of the above-described electrically conductive agent include carbon materials such as carbon black (CB), acetylene black (AB), Ketjen black, and graphite. Examples of the above-described binding agent include a fluorine-based resin such as polytetrafluoroethylene (PTFE) or a poly (vinylidene fluoride) (PVdF), a polyacrylonitrile (PAN), a polyimide (PI), an acrylic-based resin, and a polyolefin-based resin. In addition, those resins each may be used together with a carboxymethyl cellulose (CMC) or a salt thereof, or a polyethylene oxide (PEO), or the like. Those resins may be used alone, or at least two types thereof may be used in combination.

The negative electrode 24 includes the belt-like negative electrode current collector 24a and a negative electrode active material layer formed on the negative electrode current collector. For example, the negative electrode active material layers are formed on two surfaces of the negative electrode current collector 24a. For the negative electrode current collector 24a, foil of a metal, such as aluminum and copper, that is stable in the electric potential range of the negative electrode, a film with such a metal disposed as an outer layer, and the like is used, for example.

It is preferable for the negative electrode active material layers to be formed over the entire regions of the two surfaces of the negative electrode current collector 24a other than plain portions described later. It is preferable for the negative electrode active material layer to contain a negative electrode active material and a binding agent. If required, the negative electrode active material layer may contain the electrically conductive material. The negative electrode 24 is manufactured by, for example, applying a negative electrode mixture slurry containing a negative electrode active material, a binding agent, water and the like, to two surfaces of the negative electrode current collector 24a, drying it, and rolling it.

The material to be used as the negative electrode active material is not particularly limited, and any material capable of reversibly occluding and releasing lithium ions may be used. For example, a carbon material such as natural graphite or artificial graphite, a metal, such as Si or Sn, forming an alloy with lithium, an alloy of the metal mentioned above, or a composite oxide may be used. As the binding agent contained in the negative electrode active material layer, for example, a resin similar to that used in the case of the positive electrode 23 may be used. When the negative electrode mixture slurry is prepared using an aqueous solvent, a styrene-butadiene rubber (SBR), a CMC or a salt thereof, a polyacrylic acid or a salt thereof, a polyvinyl alcohol, or the like may be used. Those materials may be used alone, or at least two thereof may be used in combination.

The negative electrode 24 has plain part, at which a surface of a metal forming the negative electrode current collector 24a is exposed. The plain portions are portions to which the negative electrode lead 26 is connected, and are portions at each of which the surface of the negative electrode current collector 24a is not covered with the negative electrode active material layer. The plain portions each have an almost rectangular shape in front view extending long in the axial direction α which is a width direction of the negative electrode 24, and are each formed to have a width larger than that of the negative electrode lead 26.

The negative electrode lead 26 is bonded to the surface of the negative electrode current collector 24a by, for example, welding such as ultrasonic welding. Note that negative electrode leads different from the negative electrode lead 26 may be also provided at a middle portion in the winding direction, a winding-start side end portion, and the like, respectively, in addition to the winding-finish side end portion on the negative electrode 24, to extend from the electrode group to the bottom plate part 51 side. The extended negative electrode leads may be superposed on the negative electrode lead 26 at the winding core part so that the extended negative electrode leads and the negative electrode lead 26 are welded to the outer casing can 50 by irradiation with the laser beam. In this case, providing the negative electrode leads at a plurality of positions on the negative electrode 24 leads to improvement in the current collection. The plain portion is provided, for example, by intermittent application in which the negative electrode mixture slurry is not applied on a part of the negative electrode current collector 24a.

The positive electrode lead is bonded to the plain portion formed on the positive electrode current collector 23a, and a portion of the positive electrode lead protruding upwardly from the positive electrode current collector 23a is bonded to the positive electrode terminal or a portion connected to the positive electrode terminal.

As the separator 25, a porous sheet having ion permeability and an insulating property is used. Specific examples of the porous sheet include a fine porous thin film, a woven cloth, and a non-woven cloth. As a material of the separator 25, an olefin resin such as a polyethylene or a polypropylene is preferable.

The welding part 54 is formed by molten traces as described above, in which the first layer 56 and the second layer 58 are laminated in the thickness direction of the outer casing can 50. The first layer 56 is formed from the negative electrode lead 26 to the inside of the outer casing can 50.

Figure 4:
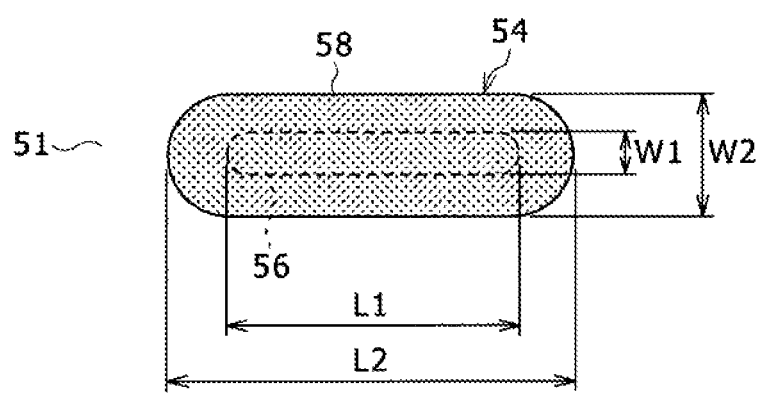
FIG. 4 is an enlarged view illustrating a portion B of FIG. 2.
Figure 5:
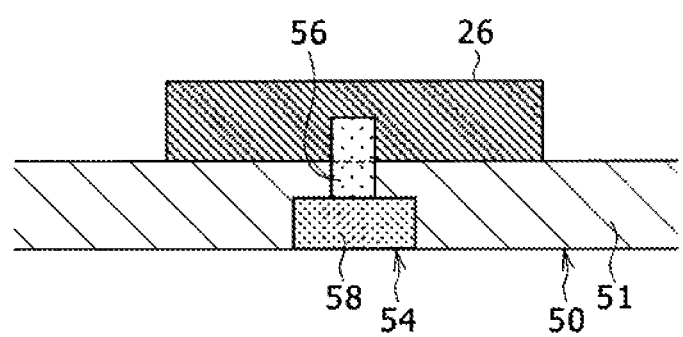
FIG. 5 is a sectional view taken along line C-C of FIG. 3.

The second layer 58 is formed so as to adjoin the first layer 56 on the outside surface side of the outer casing can 50. A boundary between the first layer 56 and the second layer 58 is positioned inside the bottom plate part 51 of the outer casing can 50, and does not protrude from the inner surface (an upper surface in FIG. 1) of the bottom plate part 51. When the welding part 54 is viewed from the outside (a lower side in FIG. 1) of the bottom plate part 51 of the outer casing can 50 as illustrated in FIG. 2, all of the first layer 56 is covered with the second layer 58, as illustrated in FIG. 4. The second layer 58 is formed by being irradiated with the second laser beam 41 from the outside of the outer casing can 50 toward the bottom plate part 51, the second laser beam 41 being a laser beam to be applied in a second step subsequent to a first step, as described later.

As illustrated in FIG. 4, the first layer 56 has a linear planar shape when viewed from the outside of the bottom plate part 51 of the outer casing can 50. The second layer 58 also has a linear planar shape when viewed from the outside of the bottom plate part 51, and a width w2 of the second layer 58 is larger than a width w1 of the first layer 56. The second layer 58 has a higher nickel concentration (mass %) than the first layer 56. The presence of the first layer 56 and the second layer 58 can be confirmed by, for example, observing a cross section of the molten traces in the thickness direction of the outer casing can 50 using an optical microscope or the like. The first layer 56 cannot actually be seen from the outside of the bottom plate part 51 of the outer casing can 50. Regarding the above-described first layer 56, the phrase "when viewed" in the phrase a planar shape when viewed from the outside of the outer casing can 50 simply means a visual line direction. For example, the planar shape of the first layer 56 can be confirmed by observing a cross-sectional shape when the first layer 56 is cut along a plane being parallel to the outside surface of the bottom plate part 51 of the outer casing can 50 and including the first layer 56.

It is preferable that a laser beam of a fiber laser is used as each of the laser beams. The fiber laser has a very small spot diameter of about 0.02 mm to 0.05 mm, for example, and therefore the molten trace formed by the fiber laser can also have a very small width of about 0.1 mm. Therefore, the power density of the laser beam at the converging point can be made very high. As described later, when the cell 20 is moved relative to the laser beam in a direction perpendicular to an irradiation direction of the laser beam, the welding part 54 that is welded by the laser beam is easily formed in a thin linear shape when viewed from the outside of the bottom plate part 51. At this time, the cell 20 can be disposed with the bottom plate part 51 facing upward, so that the bottom of the cell 20 is irradiated with the laser beam. The cell 20 can be also disposed with the bottom plate part 51 inclined transversely, so that the bottom plate part 51 is irradiated with the laser beam.

As in another example illustrated in FIG. 6 and FIG. 7 described later, by providing a plurality of welding parts 54a, 54b, and 54c formed in a linear shape, the weld strength is easily secured. It is preferable to use the laser beam of the fiber laser to locally form such welding parts.

Next, there will be described a manufacturing method for a cell according to an embodiment including a welding process of welding the outer casing can 50 and the negative electrode lead 26. In this manufacturing method, the welding process includes a first beam irradiation process and a second beam irradiation process.

Before the first beam irradiation process is performed, the electrode body 22 is accommodated in the outer casing can 50 in a state in which the negative electrode lead 26 faces the inner surface of the bottom plate part 51 of the outer casing can 50. In this state, the bottom plate part 51 is irradiated with the laser beams from the outside of the outer casing can 50 in two steps including the first beam irradiation process and the second beam irradiation step. Specifically, in the first beam irradiation process, the bottom plate part 51 is irradiated with the first laser beam 40 as a first energy beam, the outer casing can 50 and the negative electrode lead 26 are welded in the irradiation position, and the irradiation portion of the first laser beam 40 is moved on the outside surface of the bottom plate part 51 of the outer casing can 50 toward one side (for example, a right side in FIG. 1) along the linear direction. At this time, a light source of the laser beam is moved so that the cell 20 is moved relative to the laser beam in a direction perpendicular to the irradiation direction of the laser beam.

Next, in the second beam irradiation process, the bottom plate part 51 is irradiated with the second laser beam 41 as a second energy beam from the outside of the outer casing can 50, over a wider range than the irradiation range of the first laser beam 40 onto the bottom plate part 51. At this time, it is preferable that the spot diameter of the second laser beam 41 is larger than the spot diameter of the first laser beam 40. The bottom plate part 51 is irradiated with the second laser beam 41 so that a molten trace formed by irradiation with the second laser beam 41 does not pass through the outer casing can 50, thereby avoiding reaching the negative electrode lead 26. At this time, for example, the irradiation portion of the second laser beam 41 is moved on the outside surface of the bottom plate part 51 of the outer casing can 50 toward one side (for example, a right side in FIG. 1) along the above-described linear direction, whereby the first layer 56 and the second layer 58 are formed. The first layer 56 is formed in a range of a molten trace formed by irradiation with the first laser beam 40, this range not being fused by the second laser beam 41. The second layer 58 is formed so as to adjoin the first layer 56. Also at this time, the light source of the laser beam is moved so that the cell 20 is moved relative to the laser beam in a direction perpendicular to the irradiation direction of the laser beam. The second layer 58 faces the outside surface of the bottom plate part 51, and the boundary between the first layer 56 and the second layer 58 is positioned inside the bottom plate part 51 of the outer casing can 50. As described above, the bottom plate part 51 is irradiated with the first laser beam 40 and the second laser beam 41 so that the irradiation portions of the first laser beam 40 and the second laser beam 41 are moved on the outside surface of the bottom plate part 51 along the same linear direction. The planar shapes of the first layer 56 and the second layer 58 are formed in a linear shape when viewed from the outside of the bottom plate part 51. In addition, when viewed from the outside of the bottom plate part 51, the whole of the first layer 56 is covered by the second layer 58. Note that any one of the laser beam and the outer casing can 50 is moved so that the irradiation portion of the laser beam can be moved relative to the outside surface of the outer casing can 5, in other words, the outer casing can 50 may be actually moved.

According to the cell 20 according to the above-described embodiment and the manufacturing method for the same, in the welding part 54 of the cell 20, the second layer 58 on the surface side of the outer casing can 50 has a higher nickel concentration than the first layer 56 on the negative electrode lead 26 side. Thus, the corrosion preventive property of the molten trace exposed to the outside surface of the outer casing can 50 of the cell 20 can be higher than that of a cell having no second layer 58.

According to the manufacturing method for the cell according to the embodiment, since the spot diameter of the second laser beam 41 for forming the second layer 58 is larger than the spot diameter of the first laser beam 40 for forming the first layer 56, an irradiation area of the second laser beam 41 on the outside surface of the outer casing can 50 is larger than that of the first laser beam 40. Furthermore, an irradiation depth of the second laser beam 41 is smaller than that of the first laser beam 41. Therefore, since nickel in the nickel plated layer is fused in a wide area of the outer casing can 50 and the fusion amount of iron of the outer casing can 50 is suppressed, the second layer 58 can have the high nickel concentration. Accordingly, the nickel concentration of the second layer 58 can be easily controlled by controlling the irradiation area and the irradiation depth of the second laser beam 41 on the outer casing can 50.

The whole of the first layer 56 is covered with the second layer 58 when the welding part 54 is viewed from the outside of the outer casing can 50, and the first layer 56 is not exposed to the outside surface of the outer casing can 50. Thus, the corrosion preventive property of the molten trace exposed to the outside surface of the outer casing can 50 can be improved compared with a cell in which the molten trace formed to pass through the outer casing can is exposed to the outside surface of the outer casing can.

When the second layer 58 having a higher nickel concentration than the first layer 56 is formed on the outside surface of the outer casing can 50, the corrosion preventive property of the molten trace exposed to the surface of the outer casing can 50 can be improved. Therefore, the nickel concentration of the second layer 58 is not limited to a particular value. However, it is preferable that the nickel concentration of the second layer 58 is 1.4 mass % or more. When the nickel concentration of the second layer is 1.4 mass % or more, the corrosion prevention effect has low dependence on the nickel concentration, and therefore the stable corrosion prevention effect can be obtained.

Furthermore, according to the embodiment, each of the first layer 56 and the second layer 58 in the welding part 54 has a linear planar shape when the first layer 56 and the second layer 58 are viewed from the outside of the outer casing can 50. Therefore, compared with a cell in which the negative electrode lead is spot welded to the outer casing can, a bonding area between the outer casing can 50 and the negative electrode lead 26 is increased, so that a bonding strength can be increased. In particular, the strength against torque applied in a direction of rotating the negative electrode lead 26 with respect to the outer casing can 50 can be increased. Since the first layer 56 has a linear planar shape when viewed from the outside of the outer casing can 50, the second layer 58 is formed in a shape to cover the first layer 56, whereby an area of a portion of the second layer 58 protruding from the first layer 56 can be easily increased when viewed from the outside of the outer casing can. Thus, the nickel concentration of the second layer 58 can be easily increased. When the fiber laser is used as each of the laser beams, the irradiation depths of the first laser beam 40 and the second laser beam 41 and the irradiation area of the second laser beam 41 can be controlled with high precision. Therefore, the dimensions (thickness, width, and length) of the first layer 56 and the second layer 58 can be controlled with high precision, and the nickel concentration of the second layer 58 can be controlled with high precision. Note that it is only required that the planar shape of each of the first layer 56 and the second layer 58 be formed in a linear shape when the welding part 54 is viewed from the outside of the outer casing can 50, but shape is not limited to the linear shape. For example, the planar shape of each of the first layer 56 and the second layer 58 may be formed in a curved shape.

Next, the experimental results for verifying the advantageous effects of the above-described embodiment will be described. The cell of Example 1 described below was used for the experiments.

Example 1

Dimensions of a configuration of Example 1 are illustrated, but the present disclosure is not limited to the following dimensions. With reference to FIG. 4, the width w2 in a short side direction when the second layer 58 is viewed from the outside of the outer casing can 50 is larger than the width w1 in the short side direction when the first layer 56 is viewed from the outside of the outer casing can 50, and is three times or less of the width w1. In addition, the length L2 in a long side direction when the second layer 58 is viewed from the outside of the outer casing can 50 is larger than the length L1 in the long side direction when the first layer 56 is viewed from the outside of the outer casing can 50, and is twice or less of the length L1. Furthermore, with reference to FIG. 3, the thickness D2 of the second layer 58 is larger than the thickness of the nickel plated layer (not illustrated) on the outside surface of the outer casing can 5, and is 0.8 times or less of the thickness Dc of the outer casing can 50.

As more specific dimensions, the outer casing can 50 is made of nickel-plated iron, and the thickness of the nickel plated layer of the outside surface is 3.5 μm. The total thickness including the nickel plated layer of the outer casing can 50 is 300 μm. Furthermore, the dimensions of the first layer 56 and the second layer 58 of the welding part 54 are as follows.
(First Layer 56)
(1) Width w1 in the short side direction when viewed from the outside of the outer casing can 50: 80 μm
(2) Length L1 in the long side direction when viewed from the outside of the outer casing can 50: 1000 μm
(3) Thickness (length from the boundary between the first layer 56 and the second layer 58 to a terminal inside the negative electrode lead 26) D1: 230 μm
(Second Layer 58)
(1) Width w2 in the short side direction when viewed from the outside of the outer casing can 50: 170 μm
(2) Length L2 in the long side direction when viewed from the outside of the outer casing can 50: 1600 μm
(3) Thickness (length from the outside surface of the outer casing can 50 to a boundary between the first layer 56 and the second layer 58) D2: 120 μm The above-described cell of Example 1 was used to determine nickel concentration in a cross section of the welding part 54, which is a molten trace, taken along the short side direction of the welding part 54 in the outside surface of the outer casing can 50 and along the thickness direction of the outer casing can 50. As a result, it was confirmed that the nickel concentration of the first layer 56 was 1.24 mass %, whereas the nickel concentration of the second layer 58 was 2.17 mass % which was in the above-described preferable concentration range of 1.4 mass % or more. Thus, in the example, it was confirmed that the corrosion preventive property of the molten trace exposed to the outside surface of the outer casing can 50 could be improved.

Example 2

To verify the advantageous effects of the manufacturing method of the embodiment, the following outer casing can 50 and the following irradiation conditions of the laser beam were used to prepare a cell of Example 2.

The outer casing can 50 is made of nickel-plated iron, and the thickness of the nickel plated layer of the outside surface is 3.5 μm, as in Example 1 described above. The total thickness including the nickel plated layer of the outer casing can 50 is 300 μm.

The irradiation conditions of the first laser beam 40 and the second laser beam 41 are as follows.
(First Laser Beam 40)
(1) Energy: 0.6 J
(2) Laser spot diameter: 20 μm
(3) Movement speed: 470 mm/sec.
(Second Laser Beam 41)
(1) Energy: 0.8 J
(2) Laser spot diameter: 170 μm
(3) Movement speed: 470 mm/sec.

In Example 2, the welding part 54 was formed under the above-described conditions. When being irradiated with the first laser beam 40, a molten trace was formed from the outer casing can 50 to the negative electrode lead 26. Regarding the molten trace, the width in the short side direction in the outside surface of the outer casing can 50 was 80 μm, the length in the long side direction in the outside surface of the outer casing can 50 was 1000 μm, and the thickness (length from the outside surface of the outer casing can 50 to a terminal inside the negative electrode lead 26) was 350 m. Subsequently, when being irradiated with the second laser beam 41, a molten trace formed by irradiation with the first laser beam 40 was fused again at a portion from the outside surface of the outer casing can 50 to a depth of 120 μm. Then, a portion from the depth of 120 μm from the outside surface of the outer casing can 50 to the terminal inside the negative electrode lead 26 remained as the first layer 56. At the same time, the second layer 58 was formed in which the width in the short side direction in the outside surface of the outer casing can 50 was 170 μm, the length in the long side direction in the outside surface of the outer casing can 50 was 1600 μm, and the thickness from the outside surface of the outer casing can 50 was 120 μm. At this time, the boundary between the first layer 56 and the second layer 58 was formed inside the outer casing can 50 and at a depth of 120 μm from the outside surface of the outer casing can 50.

The nickel concentration was determined in a cross section of the welding part 54, which was formed under such conditions, taken along the short side direction in the outside surface of the outer casing can 50 and along the thickness direction of the outer casing can 50. As a result, as in Example 1 described above, the nickel concentration of the first layer 56 was 1.24 mass %, whereas the nickel concentration of the second layer 58 was 2.17 mass %. In this way, it was confirmed that the nickel concentration of the second layer 58 could be controlled to be 1.4 mass % or more by controlling the irradiation area and the irradiation depth of the second laser beam 41 on the outer casing can 50. In addition, it was confirmed that the corrosion preventive property of the molten trace exposed to the outside surface of the outer casing can 50 could be improved.

Figure 6:
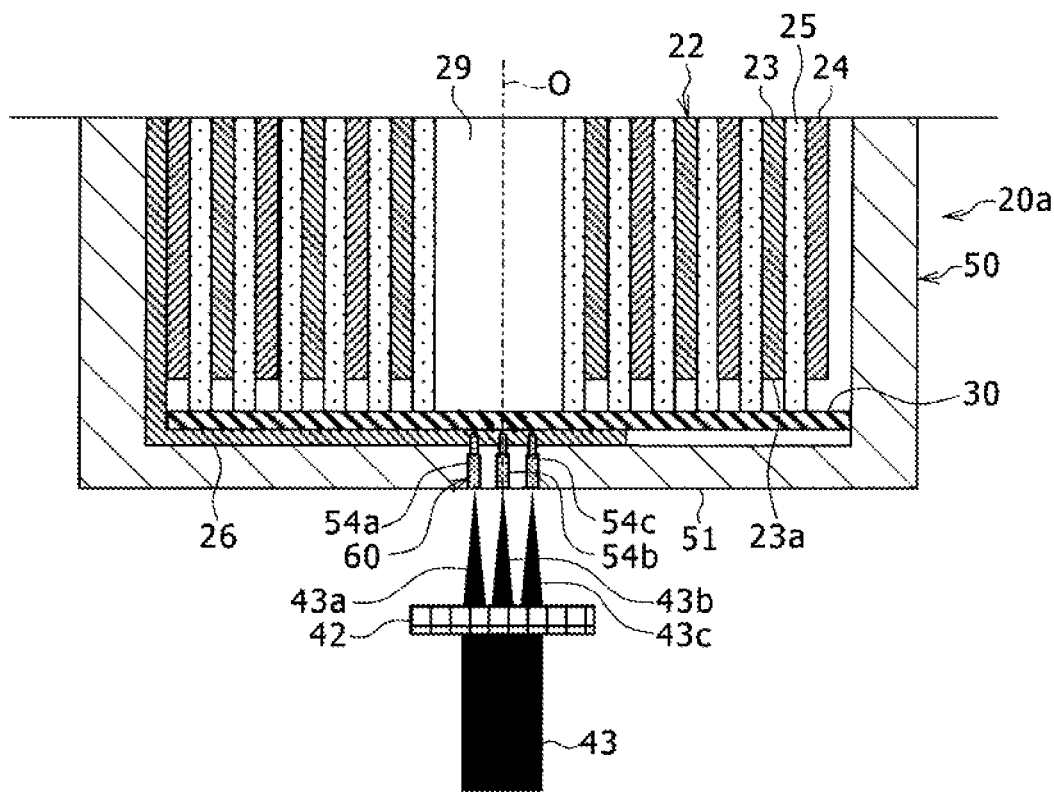
FIG. 6 is a sectional view illustrating a bottom surface side half part of a sealed cell according to another example of the embodiment.
Figure 7:
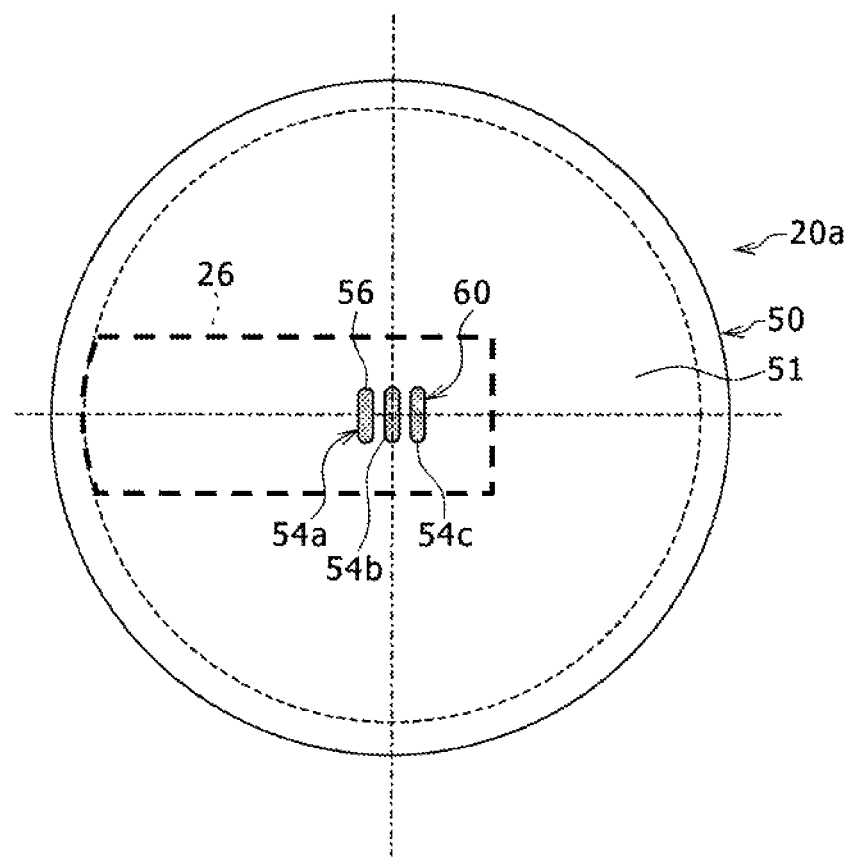
FIG. 7 is a bottom plan view of the sealed cell illustrated in FIG. 6.

FIG. 6 is a sectional view illustrating a bottom surface side half part of a cell 20a according to another example of the embodiment. FIG. 7 is a bottom plan view of the cell 20a illustrated in FIG. 6. In the present example, the negative electrode lead 26 and the outer casing can 50 are welded at a plurality of positions. Specifically, as illustrated in FIG. 7, the negative electrode lead 26 and the outer casing can 50 are welded by a welding group 60 including three linear welding parts 54a, 54b, and 54c when viewed from the outside of the bottom plate part 51. Each of the welding parts 54a, 54b, and 54c is formed by the first layer 56 and the second layer 58 (FIG. 3), similar to the above-described configuration illustrated in FIG. 1 to FIG. 5. The three welding parts 54a, 54b, and 54c are arranged almost parallel to one another, when viewed from the outside of the bottom plate part 51. When a plurality of linear welding parts 54a, 54b, and 54c are thus provided, the bonding area between the negative electrode lead 26 and the outer casing can 50 is increased, whereby the welding strength can be increased. It is preferable for the number of welding parts included in the welding group to be two or more, but is not particularly limited thereto.

Next, there will be described a manufacturing method for the cell 20a illustrated in FIG. 6 and FIG. 7. In the manufacturing method of the present example, a diffraction grating 42 is used to optically divide one laser beam 43 into three laser beams 43a, 43b, and 43c and irradiate the outside surface of the bottom plate part 51 with the divided laser beams 43a, 43b, and 43c. Note that although not illustrated in FIG. 6, the divided laser beams 43a, 43b, and 43c are condensed by a condensing lens. In this way, the first layer 56 and the second layer 58 in each of the three welding parts 54a, 54b, and 54c are simultaneously formed in the three welding parts.

According to the above-described manufacturing method, when being irradiated two times with the three laser beams 43a, 43b, and 43c into which one laser beam 43 is divided, the first layer 56 and the second layer 58 are simultaneously formed at a plurality of welding positions. This enables the number of production operations to be reduced, whereby the productivity of the cell 20a can be improved. Other configurations and operations are the same as those of FIG. 1 to FIG. 5. Needless to say, the plurality of welding positions can be individually irradiated with the laser beam. For example, to form the welding group illustrated in FIG. 7, firstly, positions of the respective welding parts 54a, 54b, and 54c are irradiated sequentially with the laser beam that is the first energy beam. Next, the positions of the respective welding parts 54a, 54b, and 54c are irradiated sequentially with the laser beam that is the second energy beam. The order of irradiation with the laser beams can be determined arbitrarily.

Figure 8:
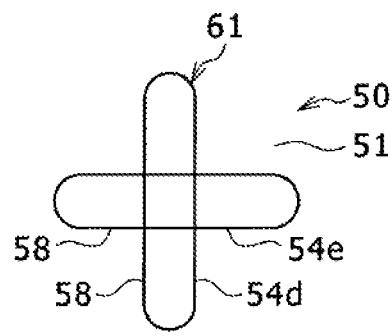
FIG. 8 is a diagram corresponding to FIG. 4, in the sealed cell according to another example of the embodiment.

FIG. 8 is a diagram corresponding to FIG. 4, in the cell according to another example of the embodiment. In the present example, a welding group 61 for welding the negative electrode lead 26 (FIG. 1) and the outer casing can 50 is formed by two welding parts 54d and 54e which are perpendicular to each other to form a cross shape when viewed from an outer side of the bottom plate part 51. The welding parts 54d and 54e are formed by the first layer 56 (FIG. 3) and the second layer 58, similar to the above-described configuration illustrated in FIG. 1 to FIG. 5. Also in this case, a plurality of linear welding parts 54d and 54e are provided, similar to the configuration illustrated in FIG. 6 and FIG. 7, and the bonding area between the negative electrode lead 26 and the outer casing can 50 is increased, whereby the welding strength can be increased. Other configurations and operations are the same as those of FIG. 1 to FIG. 5.

Figure 3:
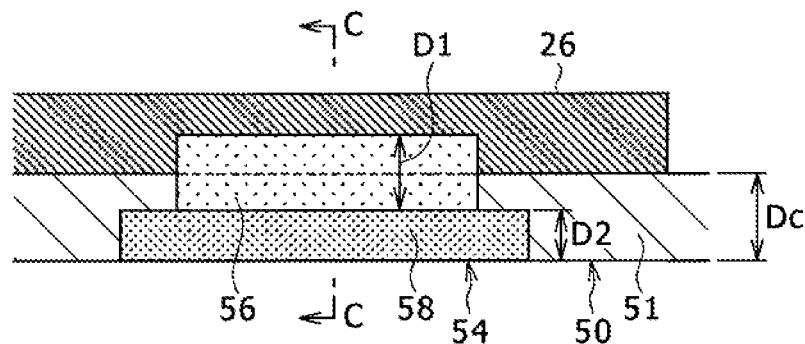
FIG. 3 is an enlarged view illustrating a portion A of FIG. 1.
Figure 9:
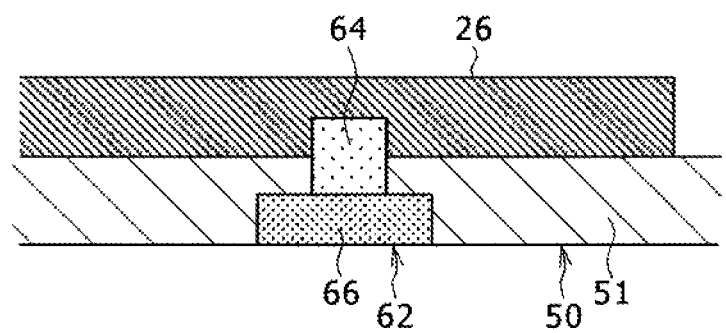
FIG. 9 is a diagram corresponding to FIG. 3, in the sealed cell according to another example of the embodiment.
Figure 10:
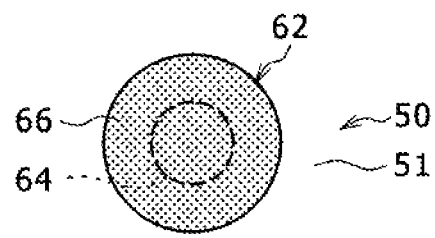
FIG. 10 is a diagram illustrating a welding part of the sealed cell illustrated in FIG. 9, viewed from outside of an outer casing can.

FIG. 9 is a diagram corresponding to FIG. 3, in the cell according to another example of the embodiment. FIG. 10 is a diagram illustrating a welding part 62 of a cell 20c illustrated in FIG. 9, when viewed from outside of the outer casing can 50. Although in the above-described examples a case has been described where the welding part for welding the negative electrode lead and the outer casing can is formed in a linear shape, in the present example, the welding part 62 for welding the negative electrode lead 26 and the outer casing can 50 is formed in a spot shape.

Specifically, the welding part 62 is formed by laminating a first layer 64 and a second layer 66 in the thickness direction of the outer casing can 50. The first layer 64 is formed from the negative electrode lead 26 to the inside of the outer casing can 50, thereby welding the outer casing can 50 and the negative electrode lead 2. The second layer 66 is formed so as to adjoin the first layer 64 on the outside surface side of the outer casing can 50. A boundary between the first layer 64 and the second layer 66 is positioned inside the bottom plate part 51 of the outer casing can 50. As illustrated in FIG. 10, the welding part 62 has a circular planar shape when viewed from the outside of the bottom plate part 51 of the outer casing can 50.

In addition, the first layer 64 has a circular planar shape when viewed from the outside of the outer casing can 50. The second layer 66 also has a circular planar shape when viewed from the outside of the outer casing can 50, and an outer circumferential diameter of the second layer 66 is larger than that of the first layer 64. The second layer 66 has a higher nickel concentration than the first layer 64. Such a welding part 62 can be formed by making the spot diameter of the second laser beam forming the second layer 66 larger than the spot diameter of the first laser beam forming the first layer 64, and by making the irradiation depth of the second laser beam smaller than that of the first laser beam.

According to the configuration of the present example, the welding part 62 has a simpler shape compared to the above-described configuration of each example, whereby a manufacturing process can be simplified and the production efficiency can be improved. Other configurations and operations are the same as those of FIG. 1 to FIG. 5.

Figure 11A:
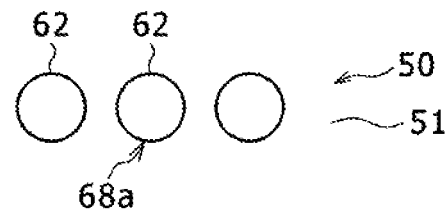
FIG. 11A is a diagram corresponding to FIG. 4, in a sealed cell according to another example of the embodiment.
Figure 11B:
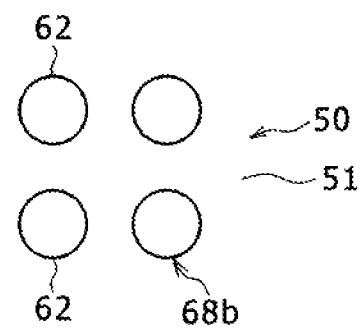
FIG. 11B is a diagram corresponding to FIG. 4, in a sealed cell according to another example of the embodiment.
Figure 11C:
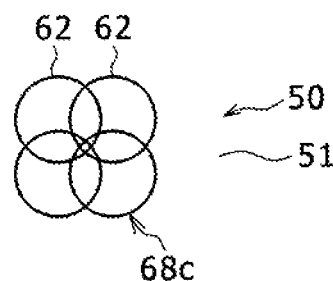
FIG. 11C is a diagram corresponding to FIG. 4, in a sealed cell according to another example of the embodiment.

FIG. 11A to FIG. 11C each are a diagram corresponding to FIG. 4, in a cell according to another example of the embodiment. In examples illustrated in FIG. 11A to FIG. 11C, respective welding groups 68a, 68b, and 68c are used to weld the negative electrode lead 26 (FIG. 1) and the outer casing can 50, the welding groups 68a, 68b, and 68c each including a plurality of welding parts 62.

For example, in the configuration of FIG. 11A, the welding group 68a is formed by three welding parts 62 which are arranged linearly when viewed from the outside of the outer casing can 50. In the configuration of FIG. 11B, the welding group 68b is formed by four welding parts 62 which are arranged at corner positions of a square. In the configuration of FIG. 11C, the welding parts 62 are arranged as in the configuration of FIG. 11B, but the distance between the welding parts 62 that are adjacent to each other is reduced so that a part of the welding part 62 overlaps with a part of the adjacent welding part 62. The configuration of each welding part 62 is the same as the configuration illustrated in FIG. 9 and FIG. 10.

According to the configuration of each example of FIG. 11A to FIG. 11C, the bonding area between the negative electrode lead 26 and the outer casing can 50 is increased compared with the configuration illustrated in FIG. 9 and FIG. 10, whereby the welding strength can be increased.

Figure 12:
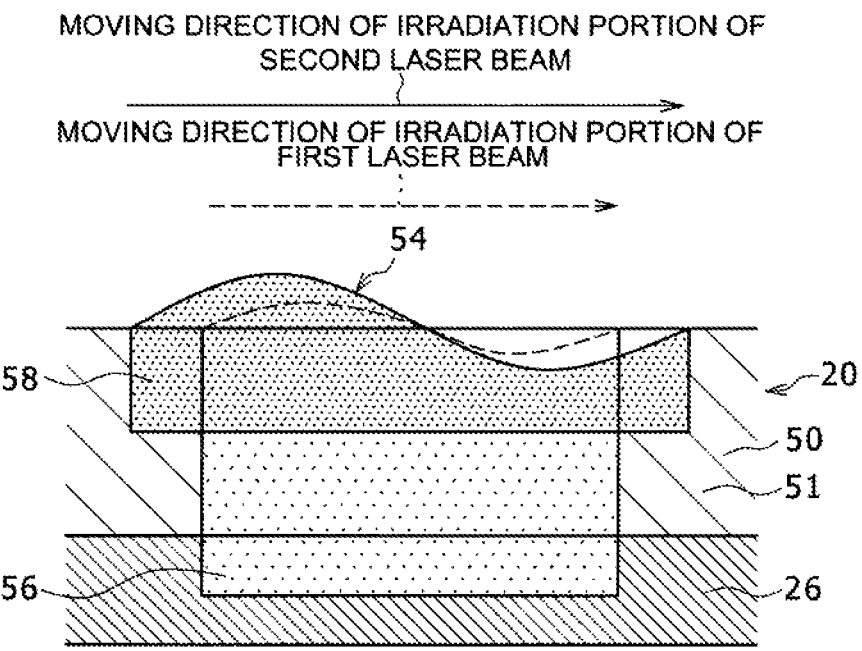
FIG. 12 is a diagram schematically illustrating a cross section of a welding part of an outer casing can and a lead in a manufacturing method for a sealed cell according to an example of an embodiment.

FIG. 12 is a diagram schematically illustrating a cross section of the welding part 54 of the outer casing can 50 and the negative electrode lead 26 in the manufacturing method for the cell 20 according to an example of the embodiment. FIG. 12 is a diagram schematically illustrating a cross section of the first layer 56 and the second layer 58 obtained by observing, using an optical microscope, a cross section of the welding part 54 taken along the long side direction in the outside surface of the bottom plate part 51 of the outer casing can 50 and along the thickness direction of the bottom plate part 51. FIG. 12 corresponds to a part illustrated in FIG. 3 which is turned upside down. FIG. 12 illustrates that the irradiation portion of the laser beam is moved on the outside surface (an upper surface in FIG. 12) of the bottom plate part 51 toward one side (for example, a right side in FIG. 12) along the linear direction (a left-right direction in FIG. 12), when the welding part 54 is formed. In this case, the structure inside the outer casing can 50 is stirred by the energy of the laser beam, with the stirring action being increased at the rear side in the moving direction as the irradiation portion is moved. As a result, the outside surface of the bottom plate part 51 of the outer casing can 50 is raised on the irradiation start end side (the left side in FIG. 12), and is recessed on the irradiation finish end side (the right side in FIG. 12). In the cross section illustrated in FIG. 12, the trend of unevenness generated on the outside surface of the bottom plate part 51 by irradiation with the first laser beam becomes the same as the trend of unevenness generated on the outside surface of the bottom plate part 51 by irradiation with the second laser beam. Specifically, when the irradiation portions of the first laser beam and the second laser beam are irradiated while being moved in the same direction on the outside surface of the bottom plate part 51, the rising side and the recessed side on the outside surface of the bottom plate part 51 resulting from irradiation with the first laser beam coincide with those resulting from irradiation with the second laser beam. Accordingly, this causes the unevenness on the outside surface of the bottom plate part 51 to become large.

Figure 13:
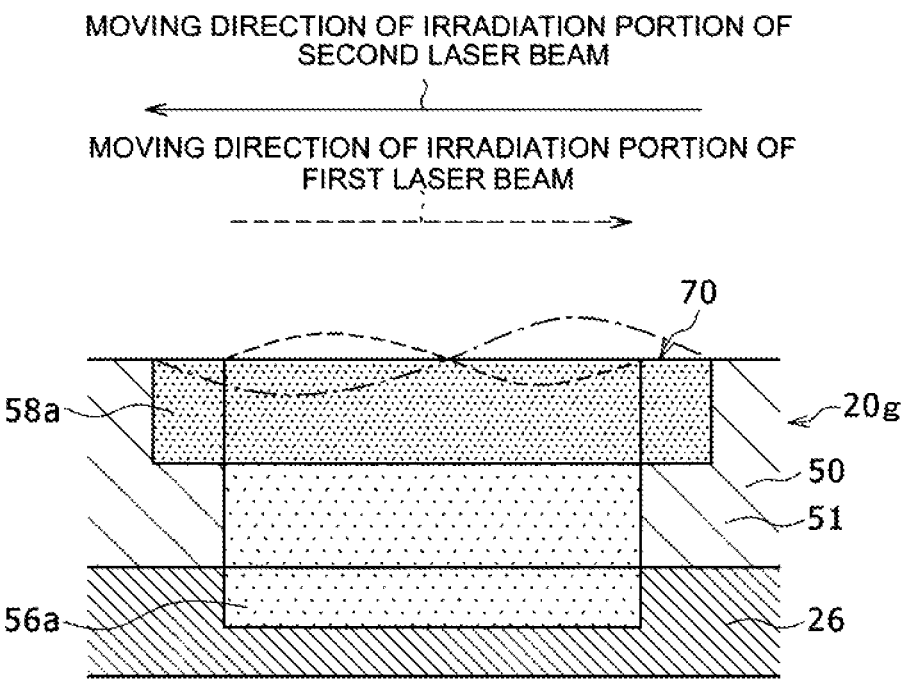
FIG. 13 is a diagram corresponding to FIG. 12, in a manufacturing method for a sealed cell according to another example of the embodiment.

On the other hand, FIG. 13 is a diagram corresponding to FIG. 12, in a manufacturing method for a cell 20 according to another example of the embodiment. In the manufacturing method illustrated in FIG. 13, the moving direction of the irradiation portion of the second laser beam is opposite to the moving direction of the irradiation portion of the first laser beam. More specifically, in the first beam irradiation process, the outside surface of the bottom plate part 51 of the outer casing can 50 is irradiated with the first laser beam while the irradiation portion of the first laser beam is moved in a first direction (a right side in FIG. 13). On the other hand, in the second beam irradiation process, the outside surface of the bottom plate part 51 of the outer casing can 50 is irradiated with the second laser beam while the irradiation portion of the second laser beam is moved in a second direction (a left side in FIG. 13) which is a direction opposite to the first moving direction.

According to the above-described manufacturing method, as illustrated in FIG. 13, the irradiation-start end side and the irradiation-finish end side in the irradiation with the first laser beam is reversed from the irradiation-start end side and the irradiation-finish end side in the irradiation with the second laser beam. In this way, the rise and the recess on the surface of the bottom plate part 51 can compensate for each other or can be reduced. FIG. 13 is a diagram schematically illustrating a cross section of the first layer 56a and the second layer 58a obtained by observing, using an optical microscope, a cross section of the welding part 70 taken along the long side direction in the outside surface of the bottom plate part 51 of the outer casing can 50 and along the thickness direction of the bottom plate part 51, similar to FIG. 12. As illustrated in FIG. 13, the rise and the recess on the surface of the bottom plate part 51 in the first layer 56a are positionally reversed from the rise and the recess on the surface of the bottom plate part 51 in the second layer 58a, whereby the unevenness on the outside surface of the bottom plate part 51 can be reduced. This facilitates the stable securing of the sealed cell when the sealed cell is made into a module.

Figure 14:
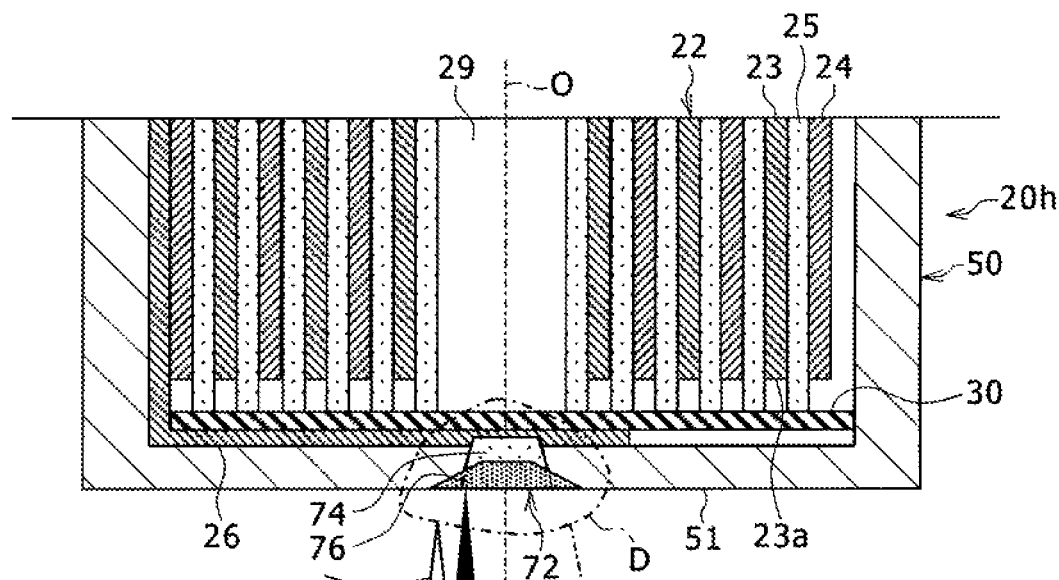
Figure 14:
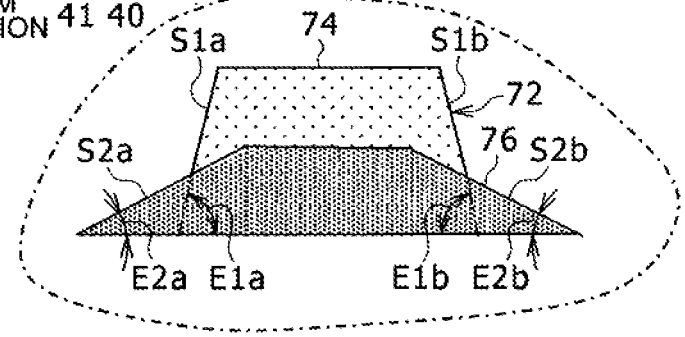
Figure 15:
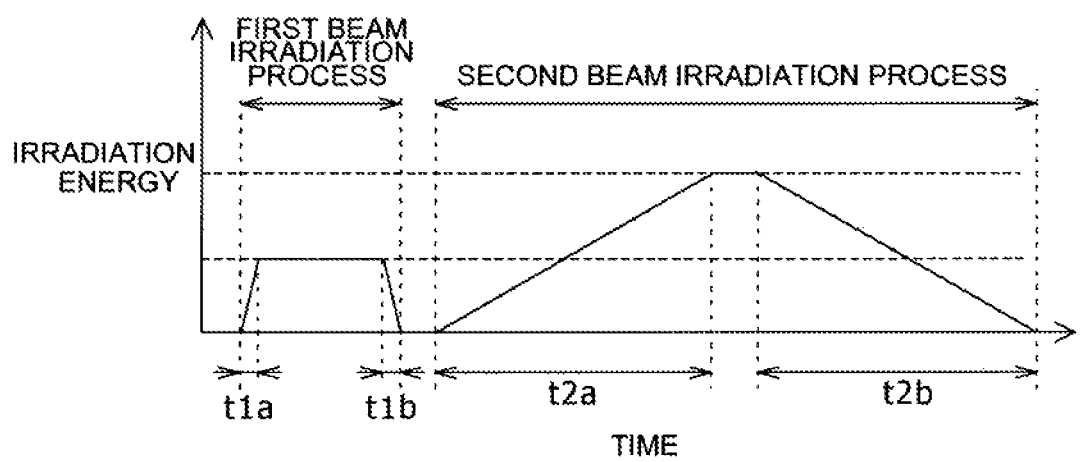
FIG. 15 is a graph showing a relationship between a time and irradiation energy in an energy beam irradiation process in the manufacturing method for the sealed cell illustrated in FIG. 14.

FIG. 14A is a sectional view illustrating a bottom surface side half part of a sealed cell 20 according to another example of the embodiment, and FIG. 14B is an enlarged view illustrating a portion D of FIG. 14A. FIG. 15 is a graph showing a relationship between time and irradiation energy in the laser beam irradiation process in the manufacturing method for the cell 20 illustrated in FIG. 14.

In the welding part 72 in the cell 20 of the present example, the gradients E2a and E2b of the inclined bottom surfaces S2a and S1b at both end portions in the long side direction of the second layer 76 with respect to the outside surface of the second layer 76 are smaller than the gradients E1a and E1b of the inclined bottom surfaces S1a and S1b at both end portions in the long side direction (left-right direction in FIG. 14) of the first layer 74 with respect to the outside surface of the second layer 76. Specifically, the first layer 74 has a linear planar shape when viewed from the outside of the bottom plate part 51 of the outer casing can 50, and the two first inclined bottom surfaces S1a and S1b are formed at both end portions in the long side direction (left-right direction in FIG. 14) so that the depth of the first layer 74 is gradually increased toward the center in the long side direction. In addition, the second layer 76 has a linear shape in which the width (length in a front-rear direction of sheet surface of FIG. 14) when viewed from the outside of the bottom plate part 51 is larger than the width of the first layer 74, and the two second inclined bottom surfaces S2a and S2b are formed at both end portions in the long side direction so that the depth of the second layer 76 is gradually increased toward the center in the long side direction. Furthermore, the gradients E2a and E2b of the second inclined bottom surfaces S2a and S2b are smaller than the gradients E1a and E1b of the first inclined bottom surfaces S1a and S1b, respectively.

In the manufacturing method for the cell 20 of the present example, to manufacture the above-described cell 20, in the first beam irradiation process, the irradiation energy is gradually increased during the irradiation-start time period t1a of the first layer 74 as shown in FIG. 15. Then, the irradiation energy is kept constant, and then the irradiation energy is gradually decreased during the irradiation-finish time period t1b. In this way, the irradiation depth (length in the up-down direction in FIG. 14) of the first layer 74 at the irradiation-start end portion (a left end portion in FIG. 14) is gradually increased as the irradiation portion is moved, whereby the first inclined bottom surface S1a is formed. With this, the irradiation depth of the first layer 74 at the irradiation-finish end portion (a right end portion in FIG. 14) is gradually decreased as the irradiation portion is moved, whereby the first inclined bottom surface S1b is formed.

Next, in the second beam irradiation process, the irradiation energy is gradually increased during the irradiation-start time period t2a of the second layer 76 as shown in FIG. 15. Then, the irradiation energy is kept constant, and then the irradiation energy is gradually decreased during the irradiation-finish time period t2b. At this time, the rate at which the irradiation energy is increased during the irradiation-start time period t2a is smaller than the rate at which the irradiation energy is increased during the irradiation-start time period t1a in the first beam irradiation process. In addition, the rate at which the irradiation energy is decreased during the irradiation-finish time period t2b is smaller than the rate at which the irradiation energy is decreased during the irradiation-finish time period t1b in the first beam irradiation process. In this way, in the second beam irradiation process, the second layer 76 is formed so that the gradients of the second inclined bottom surfaces S2a and S2b at both end portions in the long side direction of the second layer 76 are smaller than the gradients of the first inclined bottom surfaces S1a and S1b at both end portions in the long side direction of the first layer 56.

According to the cell 20 formed in the above-described manufacturing method, the gradients E2a and E2b of the second inclined bottom surfaces S2a and S2b of the second layer 76 are smaller than the gradients E1a and E1b of the first inclined bottom surfaces S1a and S1b of the first layer 74, respectively. Thus, both end portions in the long side direction of the second layer 76 are fused so that a ratio of nickel in the nickel plated layer to iron in the base metal of the outer casing can 50 becomes high, whereby the nickel concentration of the second layer 76 can be increased. Therefore, the corrosion preventive property in the molten traces can be further improved. Other configurations and operations are the same as those of FIG. 1 to FIG. 5.

To increase the nickel concentration of the second layer 76, it is preferable that the irradiation area of the second laser beam 41 be increased when the second layer 76 is formed. However, when the irradiation area of the second laser beam 41 is increased, in general, spatter and fumes are easily generated outside of the outer casing can 50. Then, since the generation of the spatter and fumes can be suppressed by reducing the angles E2a and E2b between the second inclined bottom surfaces S2a and S2b of the second layer 76 and the long side direction, it is expected to improve the productivity of the sealed cell. In addition, since the attachment of spatter and fumes to the outside of the bottom plate part 51 of the outer casing can 50 can be suppressed, it is expected to improve the bonding property between the bottom plate part 51 and the current collector lead when the sealed cell is made into a module.

Figure 16:
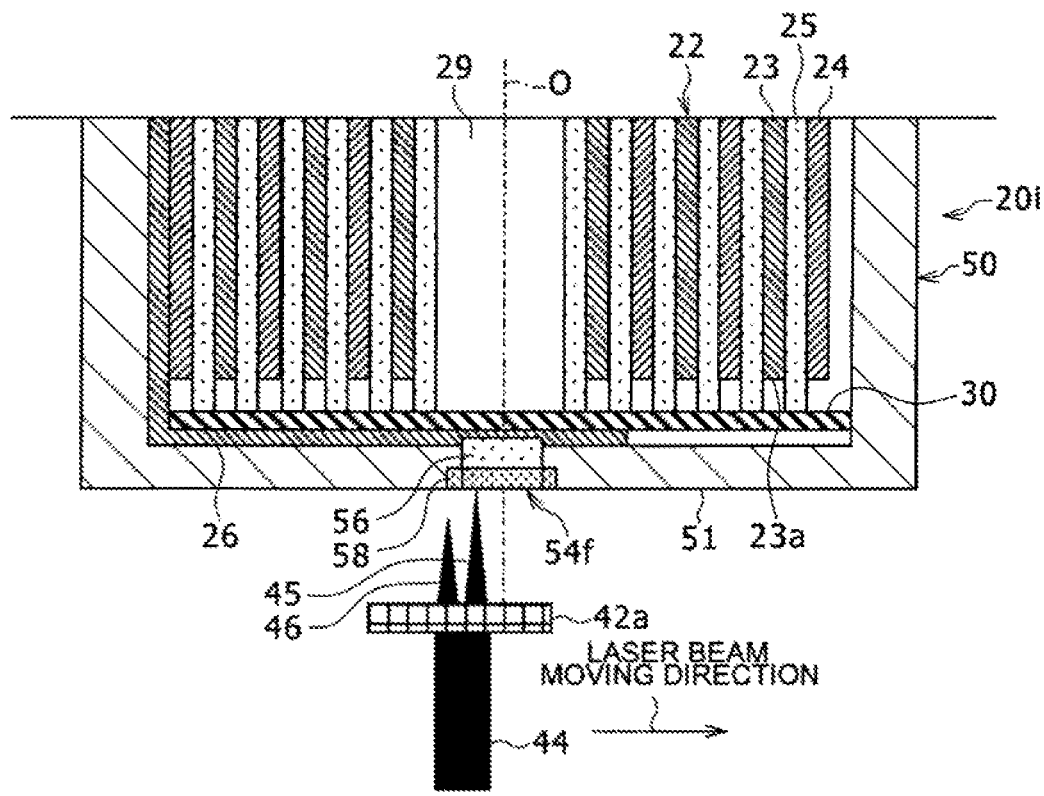
FIG. 16 is a diagram corresponding to FIG. 1, the diagram illustrating another example of a manufacturing method for a sealed cell of the embodiment.
Figure 17:
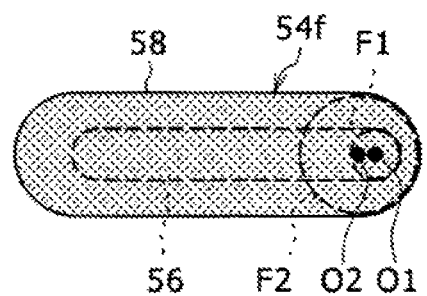
FIG. 17 is a schematic diagram illustrating a state in which a welding part of the sealed cell illustrated in FIG. 16 is viewed from the outside of the outer casing can.

FIG. 16 is a diagram corresponding to FIG. 1, the diagram illustrating another example of a manufacturing method for a cell 20 of the embodiment. FIG. 17 is a schematic diagram illustrating a state in which a welding part 54f of the cell 20 illustrated in FIG. 16 is viewed from the outside of the outer casing can 50. The configuration of the cell 20 manufactured in the manufacturing method of the present example is the same as that of the cell 20 illustrated in FIG. 1 to FIG. 5. In the manufacturing method of the present example, the welding process of welding the negative electrode lead 26 and the bottom plate part 51 of the outer casing can 50 is performed by one beam irradiation process. Specifically, in the welding process, a diffraction grating 42a is used to divide one laser beam 44 into a first laser beam 45 on a front side (a right side in FIG. 16) and a second laser beam 46 on a rear side (a left side in FIG. 16) in the moving direction of the irradiation portion. In conjunction with this, the first laser beam 45 and the second laser beam 46 are moved relative to the outer casing can 50 so that the first laser beam 45 is applied, prior to the second laser beam 46, to a predetermined position on the outside surface of the bottom plate part 51. As a result, the outer casing can 50 and the negative electrode lead 26 are welded, whereby the first layer 56 and the second layer 58 are formed.

At this time, as illustrated in FIG. 17, a center O1 of the irradiation portion of the first laser beam 45 is always positioned on the front side (a right side in FIG. 17) of a center O2 of the irradiation portion of the second laser beam 46. By adjusting the spot diameter of each of the laser beams 45 and 46, the whole of the first layer 56 can be covered with the second layer 58 when viewed from the outside surface of the outer casing can 50. In FIG. 17, a spot at the irradiation-finish end portion of the first layer 56 is indicated by a broken line F1, and a spot at the irradiation-finish end portion of the second layer 58 is indicated by a broken line F2.

According to the above-described manufacturing method, the number of light sources of the laser beam can be reduced, whereby the facility investment can be reduced. In addition, the time required for the maintenance of the facility can be reduced. On the other hand, when the number of light sources of the laser beam is increased, the differences in irradiation conditions such as laser output and spot diameter are increased, resulting in possible increase in product variations. According to the manufacturing method of the present example, the variations can be reduced. In addition, since the first layer 56 and the second layer 58 can be simultaneously formed by one irradiation with a laser beam using one light source, the number of production operations can be reduced, thereby improving the productivity. Other configurations and operations are the same as those of FIG. 1 to FIG. 5.

Although in the above-described examples, a case has been described where the negative electrode lead connected to the negative electrode is welded to the outer casing can, the configuration of the present disclosure can be applied similarly to a case where the positive electrode lead connected to the positive electrode is welded to the outer casing can.

Although in the above-described examples, a case has been described where the negative electrode lead connected to the winding-finish side end portion of the negative electrode is welded to the outer casing can, the configuration of the present disclosure can be applied similarly to a case where the negative electrode lead connected to the winding-start side end portion of the negative electrode is welded to the outer casing can.

Although in the above-described examples, a case has been described where one negative electrode lead connected to the negative electrode is welded to the outer casing can, the configuration of the present disclosure can be applied similarly to a case where a plurality of negative electrode leads connected to the negative electrode are welded to the outer casing can.

REFERENCE SIGNS LIST 20, 20a Sealed cell (cell)
22 Electrode body
23 Positive electrode
23a Positive electrode current collector
24 Negative electrode
24a Negative electrode current collector
25 Separator
26 Negative electrode lead
29 Winding core part
30 Insulating plate
40 First laser beam
41 Second laser beam
42, 42a Diffraction grating
43, 43a, 43b, 43c, 44 Laser beam
45 First laser beam
46 Second laser beam
50 Outer casing can
51 Bottom plate part
54, 54a to 54f Welding part
56 First layer
58 Second layer 60, 61 Welding group
62 Welding part
64 First layer
66 Second layer
68a, 68b, 68c Welding group
70, 72 Welding part
74 First layer
76 Second layer

The invention claimed is:

1. A sealed cell, comprising:
an electrode body in which at least one positive electrode and at least one negative electrode are laminated with a separator interposed therebetween; and
an outer casing can formed in a bottomed cylindrical shape, the outer casing can accommodating the electrode body,
wherein the outer casing can is formed by nickel-plated iron,
a lead connected to one of the positive electrode and the negative electrode is welded to the outer casing can in a welding part formed from an outside surface of the outer casing can toward the lead,
the welding part is formed by molten traces, and includes a first layer, and a second layer having a higher nickel concentration than the first layer,
the first layer is formed from the lead to an inside of the outer casing can,
the second layer is formed so as to adjoin the first layer on the outside surface side of the outer casing can, and
a whole of the first layer is covered with the second layer when the welding part is viewed from outside of the outer casing can.

2. The sealed cell according to claim 1, wherein
the first layer has a linear planar shape when viewed from the outside of the outer casing can, and
the second layer has a linear planar shape when viewed from the outside of the outer casing can.

3. The sealed cell according to claim 2, wherein
two first inclined bottom surfaces are formed at both end portions in a long side direction of the first layer so that a depth of the first layer is gradually increased toward a center in the long side direction, and
two second inclined bottom surfaces are formed at both end portions in the long side direction of the second layer so that the depth of the second layer is gradually increased toward the center in the long side direction.

4. The sealed cell according to claim 3, wherein
gradients of the first inclined bottom surfaces are larger than gradients of the second inclined bottom surfaces with respect to an outside surface of the second layer.

5. A manufacturing method for the sealed cell according to claim 1, wherein
a welding process of welding the lead and the outer casing can includes:
a first beam irradiation process in which the outside surface of the outer casing can is irradiated with a first energy beam from outside of the outer casing can to weld the outer casing can and the lead; and
a second beam irradiation process in which, after the first beam irradiation process, a wider range than an irradiation range on the outside surface of the outer casing can which is irradiated with the first energy beam is irradiated with a second energy beam from the outside of the outer casing can.

6. The manufacturing method for a sealed cell according to claim 5, wherein
in the first beam irradiation process, the outside surface of the outer casing can is irradiated with the first energy beam while an irradiation portion of the first energy beam is moved in a first direction, and
in the second beam irradiation process, the outside surface of the outer casing can is irradiated with the second energy beam while the irradiation portion of the second energy beam is moved in a second direction which is a direction opposite to the first direction.

7. The manufacturing method for a sealed cell according to claim 5, wherein
the first layer has a linear planar shape when viewed from the outside of the outer casing can, and two first inclined bottom surfaces are formed at both end portions in a long side direction so that a depth of the first layer is gradually increased toward a center in the long side direction,
the second layer has a linear shape in which a width when viewed from the outside surface of the outer casing can is larger than the width of the first layer, and two second inclined bottom surfaces are formed at both end portions in the long side direction so that the depth of the second layer is gradually increased toward the center in the long side direction, and
in the second beam irradiation process, the second layer is formed so that gradients of the respective two second inclined bottom surfaces at both end portions in the long side direction of the second layer with respect to an outside surface of the second layer are smaller than gradients of the respective two first inclined bottom surfaces with respect to the outside surface of the second layer.

8. A manufacturing method for the sealed cell according to claim 1, wherein
in a welding process of welding the lead and the outer casing can,
a diffraction grating is used to divide one energy beam into a first energy beam and a second energy beam, and irradiation portions of the first energy beam and the second energy beam are moved relative to the outer casing can so that the first energy beam is applied, prior to the second energy beam, to a predetermined position on an outside surface of the outer casing can, to weld the outer casing can and the lead, so that the first layer and the second layer are formed.

9. The manufacturing method for a sealed cell according to claim 5, wherein
each of the first energy beam and the second energy beam is a laser beam.

10. The manufacturing method for a sealed cell according to claim 6, wherein
each of the first energy beam and the second energy beam is a laser beam.

11. The manufacturing method for a sealed cell according to claim 7, wherein
each of the first energy beam and the second energy beam is a laser beam.

12. The manufacturing method for a sealed cell according to claim 8, wherein
each of the first energy beam and the second energy beam is a laser beam.

* * * * *